(12) United States Patent
Qiu

(10) Patent No.: US 11,375,807 B2
(45) Date of Patent: Jul. 5, 2022

(54) LIFTING CABINET

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 30 days.

(21) Appl. No.: 16/695,659

(22) Filed: Nov. 26, 2019

(65) Prior Publication Data

US 2021/0037969 A1 Feb. 11, 2021

(30) Foreign Application Priority Data

Aug. 5, 2019 (CN) .......................... 201910717730.6
Aug. 5, 2019 (CN) .......................... 201910718438.6
Aug. 5, 2019 (CN) .......................... 201910718446.0
Aug. 5, 2019 (CN) .......................... 201921261566.4

(51) Int. Cl.

| | |
|---|---|
| *A47B 51/00* | (2006.01) |
| *A47B 57/06* | (2006.01) |
| *A47B 97/00* | (2006.01) |
| *F16H 25/20* | (2006.01) |
| *F16H 25/22* | (2006.01) |
| *B66D 1/12* | (2006.01) |

(Continued)

(52) U.S. Cl.
CPC .............. *A47B 51/00* (2013.01); *A47B 57/06* (2013.01); *A47B 97/00* (2013.01); *B66D 1/12* (2013.01); *B66D 1/20* (2013.01); *B66D 1/26* (2013.01); *B66D 1/30* (2013.01); *B66D 1/36* (2013.01); *B66D 1/60* (2013.01); *B66D 3/18* (2013.01); *B66D 3/26* (2013.01); *F16H 25/20* (2013.01); *F16H 25/2204* (2013.01); *A47B 2220/0002* (2013.01); *A47B 2220/0091* (2013.01)

(58) Field of Classification Search
CPC .......... A47L 27/06; A47L 57/06; A47L 51/00; A47L 2200/008; A47L 2200/0083; A47L 2220/0091; A47L 2097/003; A47L 2051/005
See application file for complete search history.

(56) References Cited

U.S. PATENT DOCUMENTS

| 4,239,440 | A | 12/1980 | James | |
|---|---|---|---|---|
| 6,283,608 | B1 * | 9/2001 | Straat | A47B 97/00 312/223.5 |

(Continued)

FOREIGN PATENT DOCUMENTS

| AT | 514056 A4 | 10/2014 |
|---|---|---|
| CN | 201088284 Y | 7/2008 |

(Continued)

*Primary Examiner* — Andrew M Roersma
(74) *Attorney, Agent, or Firm* — McKee, Voorhees & Sease, PLC

(57) ABSTRACT

A lifting cabinet, comprises a cabinet body, wherein the cabinet body comprises a side plate in which at least two wire through-holes are configured, a trunking which is configured in the side plate for communicating with the two wire through-holes, and wires which are placed in the trunking and are respectively connected to electric parts in different spaces within the cabinet body through the two wire through-holes. The cabinet solves the problem of messy and unsightly appearance caused by unreasonable wire arrangement.

7 Claims, 5 Drawing Sheets

(51) Int. Cl.
  *B66D 1/20* (2006.01)
  *B66D 1/26* (2006.01)
  *B66D 1/30* (2006.01)
  *B66D 1/36* (2006.01)
  *B66D 1/60* (2006.01)
  *B66D 3/18* (2006.01)
  *B66D 3/26* (2006.01)

(56) References Cited

U.S. PATENT DOCUMENTS

| | | | |
|---|---|---|---|
| 6,359,217 B1 * | 3/2002 | Thompson | A47B 21/06 |
| | | | 174/50 |
| 6,676,233 B1 | 1/2004 | Evans et al. | |
| 7,367,685 B2 * | 5/2008 | Moll | A47B 97/00 |
| | | | 312/223.5 |
| 7,416,055 B2 | 8/2008 | Penn et al. | |
| 8,939,296 B2 * | 1/2015 | Weyler | A47B 46/005 |
| | | | 211/1.51 |
| 9,486,911 B1 | 11/2016 | Liu | |
| 10,135,268 B1 * | 11/2018 | Gokcebay | H02J 7/0027 |
| 2006/0066188 A1 | 3/2006 | Crawford | |
| 2007/0108791 A1 | 5/2007 | Okninski | |
| 2013/0188338 A1 * | 7/2013 | Melhaff | A47B 96/00 |
| | | | 362/127 |
| 2014/0196555 A1 | 7/2014 | Wu | |
| 2018/0110331 A1 * | 4/2018 | Mack | A47B 47/0075 |

FOREIGN PATENT DOCUMENTS

| | | | | |
|---|---|---|---|---|
| CN | 201480544 U | | 5/2010 | |
| CN | 201630649 U | * | 11/2010 | |
| CN | 202737328 U | | 2/2013 | |
| CN | 203885023 U | | 10/2014 | |
| CN | 203934851 U | | 11/2014 | |
| CN | 203934862 U | | 11/2014 | |
| CN | 204132770 U | | 2/2015 | |
| CN | 104466831 A | | 3/2015 | |
| CN | 205018553 U | | 2/2016 | |
| CN | 105595641 A | | 5/2016 | |
| CN | 108308879 A | * | 7/2018 | |
| CN | 109276039 A | | 1/2019 | |
| CN | 109733994 A | | 5/2019 | |
| CN | 109795952 A | | 5/2019 | |
| CN | 208988054 U | | 6/2019 | |
| CN | 109984467 A | | 7/2019 | |
| DE | 202011103891 U1 | * | 12/2011 | ............ A47B 21/06 |
| FR | 2696589 A1 | * | 4/1994 | ............ A47B 21/06 |
| GB | 2180149 A | * | 3/1987 | ............ A47B 21/06 |
| GB | 2557699 A | | 6/2018 | |
| JP | 2002228345 A | * | 8/2002 | |
| JP | 2014226508 A | | 12/2014 | |
| KR | 200414468 Y1 | | 4/2006 | |
| KR | 1020130138069 A | | 12/2013 | |
| KR | 101407534 B1 | | 6/2014 | |
| WO | 2010130570 A1 | | 11/2010 | |
| WO | WO-2014185040 A1 | * | 11/2014 | ......... H02P 29/0016 |

* cited by examiner

LIFTING CABINET

PRIORITY CLAIMS AND INCORPORATION OF RELATED APPLICATIONS

This application claims priority to the following four Chinese applications, and incorporate by reference their related pending US applications in their entireties:

(A) Chinese application 201921261566.4, filed Aug. 5, 2019;

(B) Chinese application 201910718446.0, filed Aug. 5, 2019 and U.S. Ser. No. 16/695,655, filed Nov. 26, 2019, MVS Ref No. P13068US00;

(C) Chinese application 201910717730.6, filed Aug. 5, 2019, and U.S. Ser. No. 16/695,789, filed Nov. 26, 2019, MVS Ref No. P13069US00;

(D) Chinese application 201910718438.6, filed Aug. 5, 2019, and U.S. Ser. No. 16/695,850, filed Nov. 26, 2019, MVS Ref No. P13070US00.

FIELD OF THE INVENTION

The present invention relates to the technical field of lifting cabinets, in particular to a lifting cabinet.

BACKGROUND OF THE INVENTION

With an increasing housing price, the indoor space is becoming tighter. A lifting cabinet is marketed in order to make full use of the indoor space. This lifting cabinet is generally assembled in a higher indoor position to help the user to improve the utilization of the indoor space and has one or more shelves which can be moved between raised and lowered positions.

However, the present development on the lifting cabinet generally concerns crucial issues, like how to improve the lifting capability of the storage shelf in the lifting cabinet, and usually ignore the details, leading to a poor usage experience for the user. For example, none of the lifting cabinet manufactories have a rational wire distribution in the lifting cabinet, such that the connecting wires among electric parts in the lifting cabinet are messy, which is unsightly for the user, and will damage user's favorable impression to the lifting cabinet.

SUMMARY OF THE INVENTION

It is an objective of the present invention to provide a lifting cabinet, which eliminates mess and unsightliness caused by an unreasonable wire arrangement.

The lifting cabinet comprises a cabinet body, having a side plate in which at least two wire through-holes are configured, an electrical trunking which is configured in the side plate for communicating with the two wire through-holes, and wires which are placed in the trunking and are respectively connected to electric parts in different places within the cabinet body through the wire through-holes.

Compared to the lifting cabinet in the prior art, the lifting cabinet of the present invention places the wires within the trunking in the side plate, and the wires in the trunking may be placed into different spaces of the cabinet body through the wire through-holes, whereby electric parts or components in different spaces can be connected together, which allows wire placement of the lifting cabinet in a reasonable and tidy manner, and makes the lifting cabinet attractive to the users.

Further, the electric components include an electric control mechanism and a signal sensing switch. The cabinet body further comprises a first space which is located on the upper part of the side plate, for accommodating the electric control mechanism; and a second space which is located on the lower part of the side plate, for accommodating the signal sensing switch.

Further, there are two wire through-holes. The wire through-holes comprise a first wire through-hole which is configured on the upper part of the cabinet body, for communicating the trunking with the first space of the cabinet body; and a second wire through-hole which is configured on lower part of the cabinet body, for communicating the trunking with the second space of the cabinet body.

Further, the cabinet body further comprises a cabinet door blocker which is configured on the lower part of the cabinet body, and the second space is configured in the cabinet door blocker.

Further, a sensing hole is configured in the bottom of the cabinet door blocker and is located right under the signal sensing switch.

Further, the signal sensing switch comprises a non-contact sensing switch.

For a better understanding and practice, the present invention will be described in detail below with reference to accompanying figures.

LIST OF REFERENCE NUMBER

Figure 1:
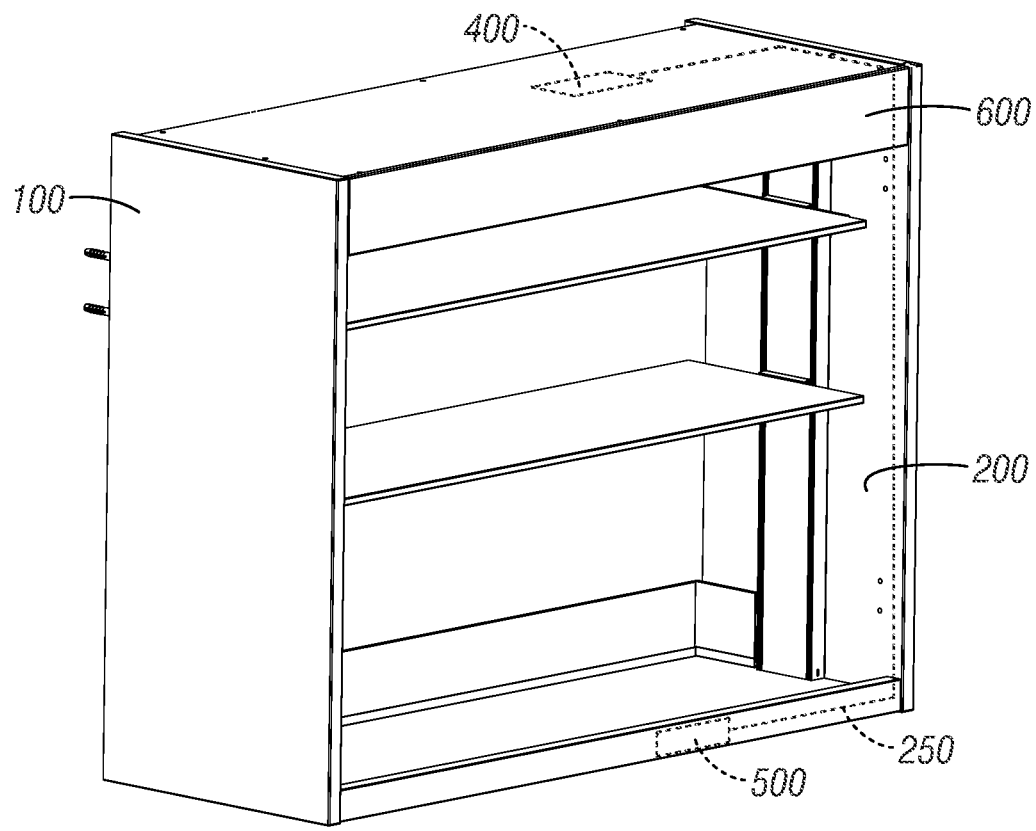
FIG. 1 is a schematic view of a lifting cabinet of the present invention.

100 cabinet body
110 first space
120 second space
200 side wall
210 trunking
220 first wire through-hole
230 second wire through-hole
250 wires
300 cabinet door blocker
400 electric control part
500 signal sensing switch
600 baffle

DETAILED DESCRIPTION OF THE PREFERRED EMBODIMENTS

In order to completely understand the objectives, characteristics and effects of the present invention, the concepts, detailed structure and resultant technical effect of the present invention will be further explained hereinafter with reference to the accompanying figures.

As shown in FIG. 1 to FIG. 5, the present invention provides a lifting cabinet, comprising a cabinet body 100, wherein the cabinet body 100 comprises a side plate 200, which may be an inside panel of a hollow wall, and in which at least two wire through-holes 220, 230 are configured, a trunking 210 which is configured in the wall of the side plate 200 for communicating with the two wire through-holes 220, 230, and wires 250 which are placed in the trunking 210 and respectively connected to electric parts in different spaces within the cabinet body 100 through the two wire through-holes.

Compared to the lifting cabinet in the prior art, the lifting cabinet of the present invention places the wires 250 within the trunking 210 in the side wall, and the wires in the trunking 210 may be placed into different spaces of the cabinet body 100 through one of the wire through-holes 220, 230, thereby electric parts 400, 500 in different spaces can be connected together, which allows wire placement of the lifting cabinet reasonable and tidy, and makes the lifting cabinet attractive to the customers.

Further, the electric parts comprise, for example, an electric control part 400 and a signal sensing switch 500. The cabinet body 100 further comprises a first space 110 which is located on the upper part of the cabinet body, for accommodating the electric control part 400; a second space 120 which is located on the lower part of the cabinet body, for accommodating the signal sensing switch 500. The first space 110 and the second space 120 are configured within the cabinet body 100, so that the electric control part 400 and the signal sensing switch 500 in the electric parts are configured in different sections, thereby, each electric part in the lifting cabinet can be arranged rationally.

Specifically, the second space 120 which is located on the lower part of the cabinet body 106 is used for accommodating the signal sensing switch 500, so that the signal sensing switch can easily receive a lifting and lowering signal, and after the lifting and lowering signal is received by the signal sensing switch 500, it is transmitted through the wires to trigger the electric control part 400 in the first space 116 to work.

Further, there are at least two wire through-holes, comprising a first wire through-hole 220 which is configured in the upper part of the side wall 200, for communicating the trunking 210 with the first space 110 of the cabinet body 100; and a second wire through-hole 230 which is configured on the lower part of the side wall 200, for communicating the trunking 210 with the second space 120 of the cabinet body 100. The electric control part 400 within the first space 110 is electrically connected to the signal sensing switch 500 within the second space 120 by the wires, through providing the first and second wire through-holes 220, 230 configured in corresponding positions of the side wall 200, and communicating the first and second spaces 110, 120 with the trunking 210 by the first and second wire through-holes 220, 230.

Further, the cabinet body 100 further comprises a third space which is located in the middle of the cabinet body, for accommodating at least one storage shelf.

Further, the cabinet body 100 further comprises a cabinet door blocker 300 (FIG. 5) which is configured on the lower part of the cabinet body 100, and the second space 120 is configured in the cabinet door blocker 300. The cabinet door blocker 300 is located between the cabinet door (not shown) and the storage shelf, to limit the position of the closed cabinet door, and prevent the cabinet door from hitting the storage shelf when closing. In addition, both the signal sensing switch 500 and a part of wires connected to the signal sensing switch are accommodated within the second space 120 in the cabinet door blocker 300, and they are invisible for users, thereby a better appearance of the lifting cabinet can be obtained.

Further, a sensing hole is configured on the bottom of the cabinet door blocker 300 and is located right under the signal sensing switch, so that the signal sensing switch may obtain a lifting and lowering signal through detecting an area under the lifting cabinet.

Preferably, the signal sensing switch comprises a non-contact sensing switch. The non-contact sensing switch may be a photoelectric switch or other non-contact sensing switch in this field, which is not limited herein. When the signal sensing switch is a photoelectric switch, the user may place their hands beneath the sensing hole so that the photoelectric switch will generate a lifting or lowering signal to lift or lower the lifting cabinet.

Preferably, the electric control part comprises a control circuit board which is used for receiving a lifting and lowering signal, and controlling a power mechanism, such as an electric motor or actuator, to work according to the lifting and lowering signal.

Specifically, one end of the electrical wire is connected to the signal sensing switch 500 within the second space 120, the rest of electrical wire is placed within the second space and extends along the direction towards the second wire through-hole 230 into the trunking 210, and then the wire extends out from the first wire through-hole 220 and connects to the electric control part 400 within the first space 110. In order to further hide the electrical wire, a baffle or cover 600 is configured between the first space 110 and the third space 130, and the first wire through-hole 220 is located above the baffle 600 so that users may not see any wires when normally using the lifting cabinet, which improves its aesthetic appearance.

Figure 2:
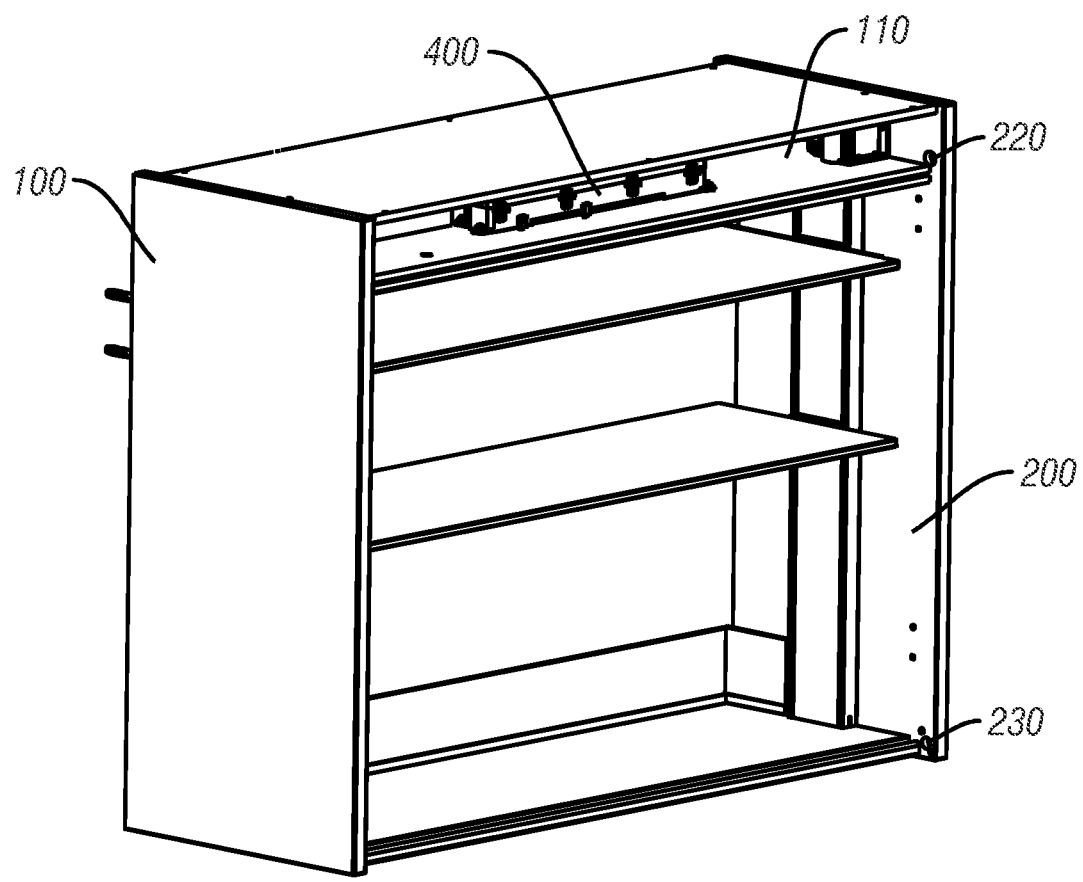
FIG. 2 is another schematic view of a lifting cabinet of the present invention with upper and lower covers removed for clarity.
Figure 3:
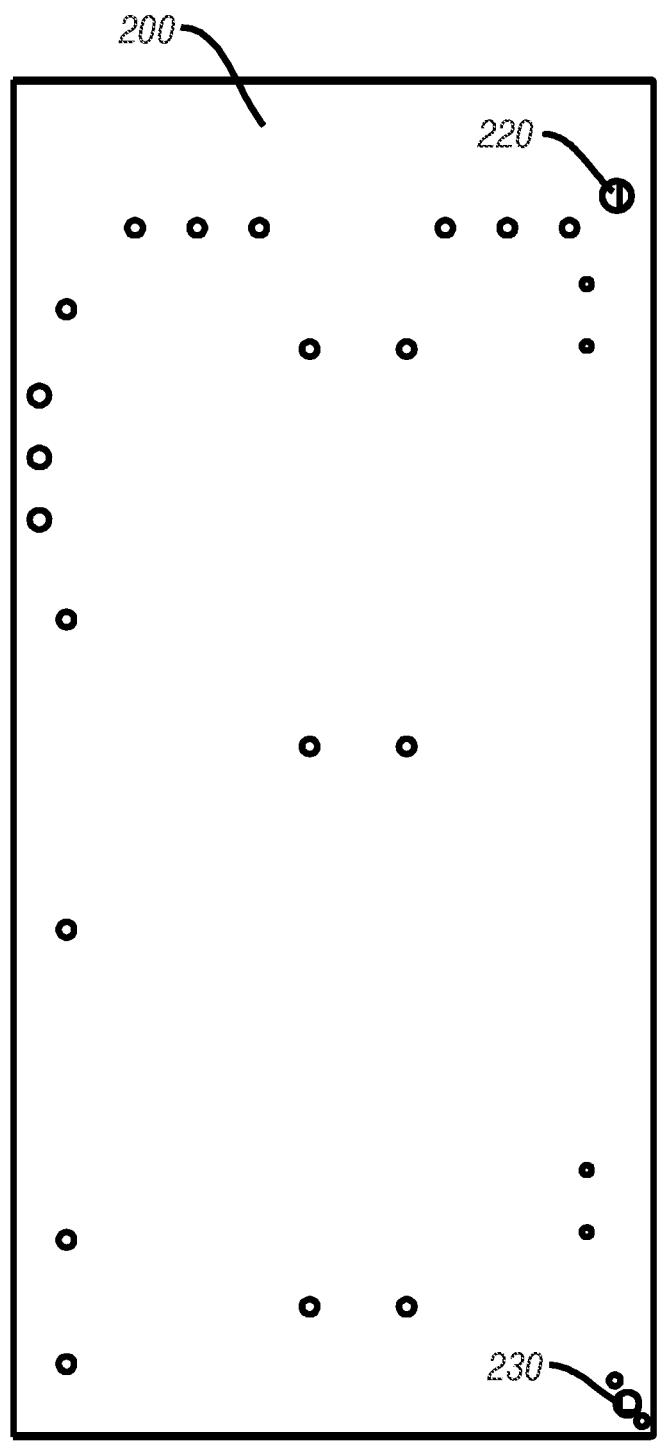
FIG. 3 is a side view of a side plate of the lifting cabinet of the present invention.
Figure 4:
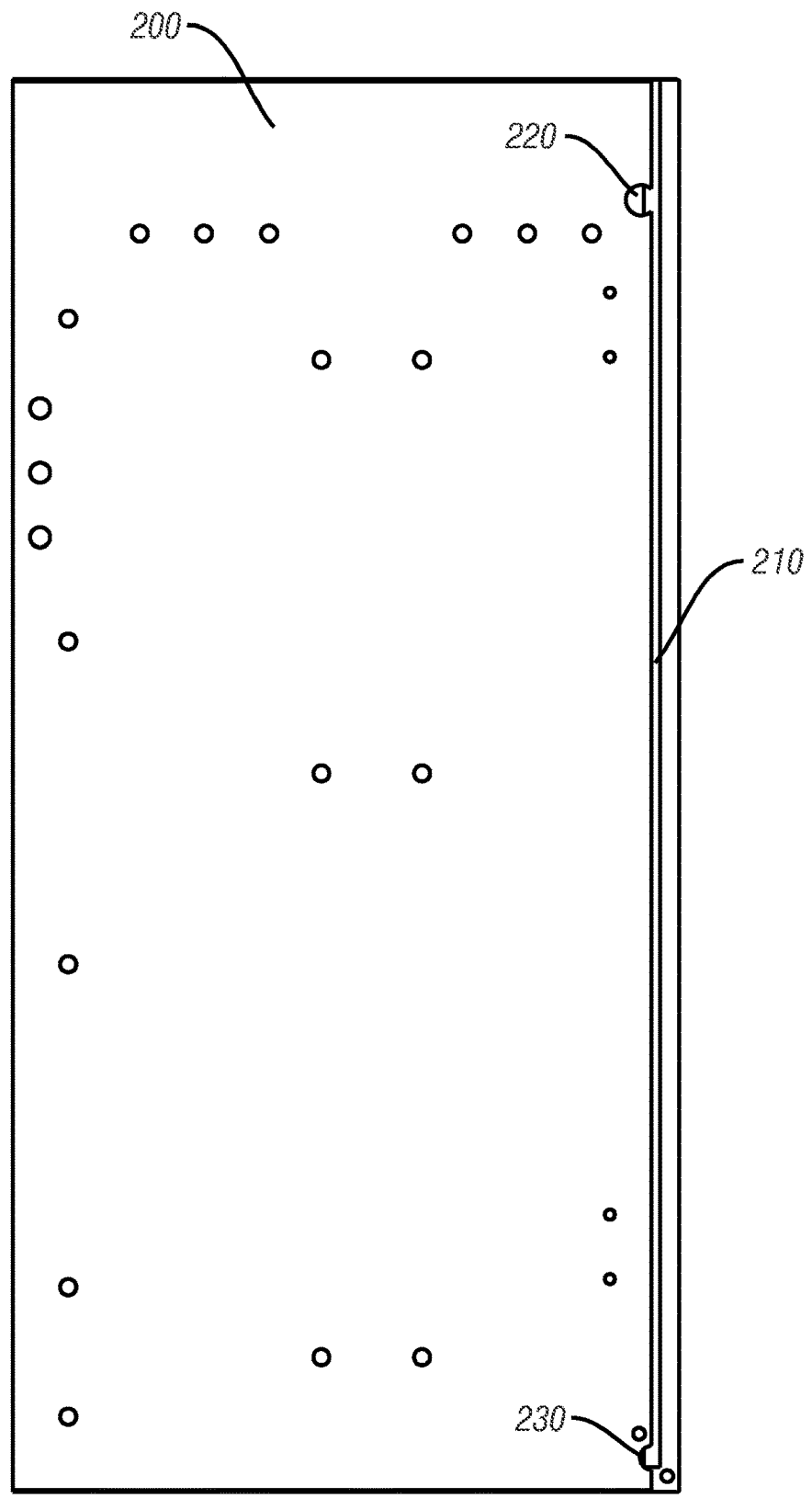
FIG. 4 is a side view of a side plate with a part of the plate removed of the lifting cabinet of the present invention.
Figure 5:
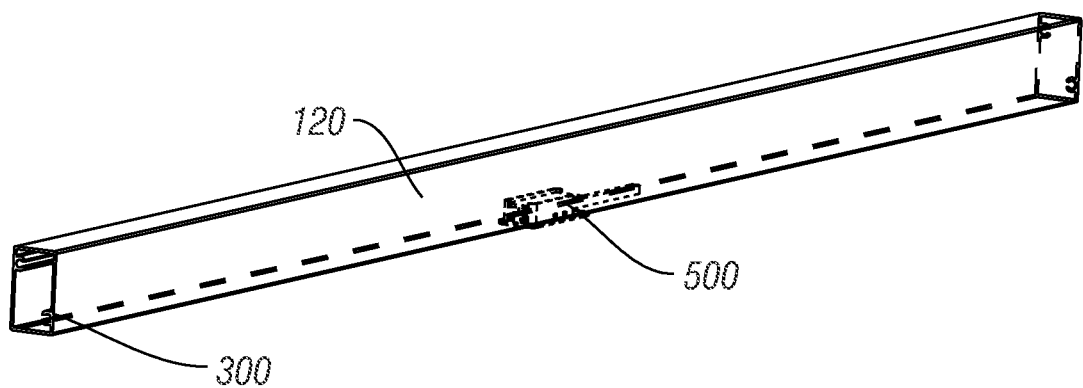
FIG. 5 is a schematic view of a cabinet door blocker of the lifting cabinet of the present invention.

It should be noted that, in FIG. 1 and FIG. 2, some parts such as cabinet door that do not affect the understanding of the present invention, are omitted in order to facilitate understanding of the content of the present invention.

It should be noted that one skilled in the art may incorporate or combine different embodiments or examples, or technical features of different embodiments or examples disclosed in the description together if there are no contradictions.

In the description of the present invention, it should be understood that the terms "longitudinal", "lateral", "front", "back", "left", "right", "vertical", "horizontal", "top", "bottom", "inner", and "outer", etc., indicate direction or position relation is based on the direction or position relation shown in figures, and is only for convenience of describing the present invention and simplifying the description, rather than indicating or implying that the indicated apparatus or parts must be configured or operated in specific direction. Therefore, these terms should not be deemed as a limit to the content protected by the present invention.

If the terms "first", "second", etc. are used herein to define a component, one skilled in the art should understand that usage of terms "first" and "second" is only for the convenience of describing the present invention and simplifying the description. Unless otherwise stated, the terms hereinbefore have no specific meanings.

The present invention is not limited to the above embodiments. Any variations or modifications without departing from the spirit and scope of the invention and within the scope of claims and equivalent technology of the present invention will be also contained in the present invention.

What is claimed is:

1. A lifting cabinet, comprising:

a cabinet body having a side plate, in which first and second wire through-holes are configured, a shelf mounted to the cabinet body for vertical movement relative to the side plate;

a trunking configured behind the side plate and communicating with the first and second wire through-holes;

wires placed in the trunking, and each said wire extending between electric parts in different spaces on the cabinet body with opposite ends of the wires extending from the first and second wire through-holes to the electric parts; and the first and second wire through-holes providing access to a hidden wire path inside the side plate for a central portion of the wires, with the opposite ends of the wires extending out of the first and second through-holes for connection to the electric parts;

the electric parts comprise an electric control part and a non-contact signal sensing switch;

the cabinet body including:

a first space, which is located on an upper part of the cabinet body for accommodating the electric control part; and a second space located on a lower part of the cabinet body for accommodating the signal sensing switch;

the first wire through-hole being configured on an upper part of the side plate for communicating the trunking with the first space, and the second wire through-hole being configured on a lower part of the side plate for communicating the trunking with the second space;

a cabinet door blocker configured on the lower part of the cabinet body, and the second space configured within the cabinet door blocker; and a sensing hole configured in a bottom of the cabinet door blocker and located adjacent the signal sensing switch.

2. A lifting cabinet, comprising:

a body having a top, a bottom, and opposite sidewalls;

a vertically moveable shelf supported by the body;

a first hole in one of the sidewalls adjacent the bottom of the cabinet;

a second hole in the one of the sidewalls adjacent the top of the cabinet;

a first space adjacent the bottom of the cabinet;

a second space adjacent the top of the cabinet;

a sensor in the first space;

an electric actuator in the second space;

a first cover on the cabinet to hide the sensor from view, and a second cover on the cabinet to hide the electric actuator from view;

a trunking extending in the one of the sidewalls between the first and second holes;

electric wires connecting the sensor to the electric actuator via the first and second holes and the trunking;

the trunking having opposite open ends adjacent the first and second holes, respectively, through which the electric wires extend;

the electric wires extending continuously from the sensor, into the first hole, through the trunking, out of the second hole, and to the electric actuator;

the wires being hidden from view between the sensor and the electric actuator by the first and second covers and by the trunking; and whereby, when the sensor receives a signal, the electric wires actuate the electric actuator to move the shelf vertically.

3. The lifting cabinet of claim 2 wherein the sensor includes a photoelectric eye.

4. The lifting cabinet of claim 2 wherein the sensor is a motion detector.

5. The lifting cabinet of claim 2 wherein the shelf is a bottom shelf adjacent the bottom of the cabinet.

6. The lifting cabinet of claim 5 further comprising a middle shelf in the cabinet above the bottom shelf and movable with the bottom shelf.

7. The lifting cabinet of claim 2 wherein the first and second holes and the trunking define a hidden wire path for the electric wires behind the one of the sidewalls.

* * * * *